United States Patent [19]

Okada et al.

[11] 4,404,042
[45] Sep. 13, 1983

[54] METHOD FOR COLOR-PAINTING ON CHROMIUM-PLATED SURFACE

[75] Inventors: Tomoyuki Okada, Tsu; Masuo Fukuda, Toda; Hideki Sugihara, Tokyo, all of Japan

[73] Assignee: Sankei Giken Kogyo Kabushiki Kaisha, Akabaneminami, Japan

[21] Appl. No.: 272,275

[22] Filed: Jun. 10, 1981

[30] Foreign Application Priority Data

Aug. 21, 1980 [JP]  Japan ................................. 55-115170

[51] Int. Cl.$^3$ ............................................... C23C 1/10
[52] U.S. Cl. .................................... 148/6.2; 427/387; 427/405; 427/407.1
[58] Field of Search ............... 204/38 E; 427/405, 387, 427/388, 388.2, 388.3, 387, 407.1; 524/366, 376; 148/6.2

[56] References Cited

U.S. PATENT DOCUMENTS 3,113,845  12/1963  Uchida et al. .................... 204/38 E
4,285,783  8/1981  Giza et al. ......................... 204/38 E

OTHER PUBLICATIONS

Burns & Bradley, Protective Coatings for Metals, 2nd Ed., Reinhold Pub. Corp., 1955, pp. 393–398.

Primary Examiner—Sam Silverberg
Assistant Examiner—Mary Beth Calligaris
Attorney, Agent, or Firm—Polster, Polster and Lucchesi

[57] ABSTRACT

A method for color-painting on a chromium-plated surface of a metal object to be painted in a desired color, wherein the chromium-plated surface of the object is coated with a mixture of a transparent paint and a coloring matter in the presence or absence of a thinner, followed by baking of the paint coating at a temperature of approximately 180 degrees Centigrade.

5 Claims, No Drawings

METHOD FOR COLOR-PAINTING ON CHROMIUM-PLATED SURFACE

BACKGROUND OF THE INVENTION a. Field of the Invention

This invention relates to a method for color-painting on a chromium-plated surface of an object to be painted.

For example, a steering handle tubing, an exhaust pipe, a silencer or muffler pipe, a carrier frame, and so on for a motorcycle is generally plated on their surface with chromium. However, such chromium-plated surface of these tubings is plain in color tone and luster, hence the chromium plating tends to be regarded as featureless and to lose its popularity among the users of the motorcycle.

With a view to avoiding such monotonousness in the outer appearance of these component parts of the motorcycle, and making the motor-operated vehicle more attractive to the users, color-painting on these component parts has been contemplated. For the color-painting, however, there has so far been available delustered silicon resin paint alone which is lack in color sense, and is not suited for those parts such as exhaust pipe and muffler that are subjected to high temperature fatigue during the motorcycle operation.

b. Description of Prior Arts

There has so far been known a method for color-painting on the chromium-plated surface of an object for obtaining an iridescent or shot coating film utilizing luster of the metal material per se, which comprises the following steps: chemical film coating treatment on the metal base→baking the film coated thereon→priming treatment→baking of the primer coating→surface treatment→metal flake (e.g., aluminum powder) application→baking of the metal flake applied→painting of coloring matter→baking of the coloring matter as painted→ coating of transparent paint→baking of the transparent paint as coated.

In view of the multiple process steps for coating, not only a great deal of time and coating appliances are necessitated, but also the resulted metal surface is coarse and its transparency is also inferior, because the glossy material used is the metal flake.

In other painting method, there has been known such one that comprises the steps of: chromium plating on the metal base→shot-blasting→air-blowing→primary treatment→baking of the primer coating→surface treatment→baking→coating of coloring matter→baking of the coloring matter→coating of transparent paint→baking of the transparent paint. Even this method, however, does not provide satisfactory surface paint coating, because the chromium-plated surface once formed becomes coarse due to the shot blasting to be effected for improving the adhesive property of the coated film. Further, the chromium-plated surface becomes low in its anti-corrosion property, inferior in its transparency and gloss, and hardly expectable to attain its heat-resistant property to a satisfactory extent.

SUMMARY OF THE INVENTION

It is therefore an object of the present invention to provide an improved method for color-painting which can be effected to a satisfactory degree on the chromium-plated surface of mufflers and exhaust pipes, is capable of producing graceful, lustered color paint surface due to the synergistic effect of the glossy chromium-plated surface of the parts and a colored transparent paint coating, and yet is less in number of the coating process steps, while maintaining resistance to heat and weathering as well as beauty of the chromium-plated surface.

According to the present invention, in general aspect thereof, there is provided an improved method for color-painting on chromium-plated surface of an object, which comprises: effecting chromium-plating on the surface of the object to be painted, coating a mixture of a transparent paint and a coloring matter onto said chromium-plated surface of the object in the presence or absence of a thinner, and baking the paint coating at a temperature of approximately 180° C.

There has thus been outlined, rather broadly, the more important feature of the present invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent construction so far as they do not depart from the spirit and scope of the present invention.

DETAILED DESCRIPTION OF PREFERRED EMBODIMENT

In the following, the present invention will be described in full detail in reference to a preferred embodiment thereof.

The painting according to the present invention is done in the following process steps. First of all, the surface of an object to be painted is plated with chromium by an ordinary plating technique. After the chromium plating, a colored transparent paint material of the following composition is directly painted on the chromium-plated surface of the object. The painting can be done by any means such as brush painting, roller-brush painting, spray painting, and others. Paint thinner may be used on painting as the case may be.

| Composition of Colored Transparent Paint | |
|---|---|
| Ingredient | Quantity |
| (a) Methylphenyl silicon resin varnish containing methyl group and phenyl group at a ratio of 1:0.5 to 1.5 | 45–63% by weight |
| (b) Methylphenyl silicon resin varnish containing methyl group and phenyl group at a ratio of 1:0.3 to 0.4 | 45–18% by weight |
| (c) Silicon resin varnish modified with any of those resins such as acryl, polyester, epoxy, and so on | 9% by weight or below |
| (d) Additional solvents: | |
| Xylol | 5% by weight |
| Butanol | 2% by weight |
| Butyl "Cellosolve"(§) | 2% by weight |
| (e) Various adjuvants such as adhesion promoter of silicon resin varnish, wetting agent, dispersing agent, color-separation preventive agent, and so on | 1% by weight |

"butyl "Cellosolve""—a trademark for ethylene glycol monobutyl ether (2-butoxy ethanol) produced and sold by Union Carbide Corporation, U.S.A.

An inorganic, heat-resistant pigment is added as a coloring agent to the transparent paint material composed of the abovementioned ingredients (a) to (e) in a quantity of 1 to 10% by weight.

Subsequent to application of the abovementioned paint composition onto the chromium-plated surface of the object, the paint coating is baked at a temperature of approximately 180 degrees Centigrade.

In other words, the painting method according to the present invention is to apply the colored-transparent paint of the abovementioned composition directly onto the chromium-plated surface of the object for the painting without subjecting the same to any physical or chemical treatment whatsoever for improving the adhesion property of the paint coating, and the thus coated paint is baked at a temperature lower than the ordinary baking temperature of paint material.

The ratio between the methyl group and the phenyl group in the methylphenyl silicon resin constituting the principal component for the colored transparent paint, the blending ratio of the modified silicon resin (acryl, polyester, or epoxy resin modified), and the adding quantity of the adjuvants (silance or titanium coupling agent) for promoting the close adhesion of the paint to the chromium-plated surface of the object contribute, by their combined effects, to the tenacious adhesion of the silicon resin paint coating.

In particular, the intimate adhesion, heat-resistant property and hardness of the paint coating are considered to be affected by the ratio between the methyl group and the phenyl group in the methylphenyl silicon resin.

In more detail, a preferred range of the blending ratio between the methylphenyl silicon resin varnish A containing methyl group and phenyl group at a ratio of 1 to 0.5–1.5 and the methylphenyl silicon resin varnish B containing methyl group and phenyl group at a ratio of 1 to 0.3–0.4 may be from 1 to 1–0.3 or so. When the ratio between A and B is 1:1 or above, the coating is very hard and fragile to lower the adhesive property of the paint coating onto the object. On the other hand, when the ratio between A and B is 1:0.3 or below, the paint coating is soft and it tends to be readily scratched.

The modified silicon resin is to improve the low temperature curing property and the adhesion property of the paint coating.

For the wetting agent, the dispersing agent, and the color separation preventive agent, a high molecular unsaturated polycarboxylic acid, for example, is suited.

Next, for a pigment for coloring the transparent paint, a heat-resistant, i.e., inorganic pigment is preferred, the adding quantity of which is within a range of from 0 to 10% by weight with respect to the transparent paint as mentioned above so as not to cause the paint to lose its transparency.

In the following, there will be enumerated examples of usable inorganic, heat-resistant pigment for colorwise.

(1) High temperature calcined products of mixtures of various metals:
For yellow:
  calcine product of titanium, nickel, and barium
  calcined product of titanium, antimony, and chromium
For brown:
  calcined product of iron and zinc
  calcined product of iron, zinc, and chromium
For green:
  calcined product of titanium, zinc, cobalt, and nickel
  calcined product of cobalt, aluminum, and chromium
For blue:
  calcined product of cobalt and aluminum
  calcined product of cobalt, aluminum, and zinc
For black:
  calcined product of iron, manganese, and copper (2) Metal oxides and others:
For white:
  titanium oxide (titanium white)
  zinc oxide (zinc flower)
For silver:
  aluminum powder or its paste
For yellow:
  cadmium sulfide (cadmium yellow)
Constituent pigment:
  mica, magnesium silicate, aluminum silicate, silica Various characteristics of the paint coating obtained by the painting method of the present invention as mentioned above (a thickness of 19 microns according to the actual example) are as follows, which are sufficiently suited for the intended purpose.

External appearance: Through the paint coating of colored transparency, excellent luster of the chromium-plated surface of the object appears as it is, without any treatment whatsoever having been done, and, owing to the synergistic effect of the luster of the chromium-plated surface and the colored transparent coating, there is presented graceful and profound iridescent color.

Luster: 100 and higher (60° of mirror surface luster)

Pencil hardness: H (with Mitsubishi Uni Pencil)

Adhesiveness: 100/100 (cross-cut adhesive tape method)

Impact resistance: 50 cm passed (DuPont system impact test: 500 g, ½ inch diameter)

Bending test: Test passed (JIS K-5400-6-15: 10 mm in diameter)

Resistance to gasoline, oil, alkali, water, acid, moisture, etc.: All tests passed Anti-spot discoloring property (with respect to resistance to water, alkali, acid, gasoline, etc.): All tests passed Heat-resistance: Various tests passed, though slightly changed to yellow (350 degree Centigrade for five hours)

Weather-resistance: Test passed

As stated in the foregoing, since the paint coating method according to the present invention comprises only steps of chromium-plating on the base metal, paint coating of the colored transparent paint, and baking of the coated paint, the process steps are remarkably simplified in comparison with the aforementioned conventional methods, and contributes to effective improvement in the painting efficiency. Moreover, since the baking temperature may be as low as 180' C. which is lower than its heat-resistant temperature which is 350° C., the present method also effectively contributes to the energy saving.

What is claimed is:

1. A method for color-painting on a chromium-plated surface of an object which comprises:
   (a) effecting chromium plating on the surface of the object to be painted;
   (b) applying to said chromium-plated surface a mixture of transparent paint and coloring matter, said transparent paint consisting of:

(1) methylphenyl silicon resin varnish containing methyl group and phenyl group at a ratio of 1:0.5 to 1.1: 45–63% by weight
(2) methylphenyl silicon resin varnish containing methyl group and phenyl group at a ratio of 1:0.3 to 0.4: 45 to 28% by weight
(3) silicon resin varnish modified with a resin selected from the group consisting of acryl, polyester, and epoxy resins: 9% by weight or below
(4) additional solvents:
xylol: 5% by weight
butyl "Cellosolve": 2% by weight
butanol: 2% by weight
(5) various adjuvants selected from the group consisting of adhesion promoter of silicon resin varnish, wetting agent, dispersing agent, and color-separation preventative agent: 1% by weight.

2. The method as set forth in claim 1, wherein said inorganic, heat-resistant pigment is selected from the group consisting of high temperature calcined products of mixtures of various metals, and metal oxides.

3. The method as set forth in claim 2, wherein said high temperature calcined product of mixtures of various metals is selected from the group consisting of calcined product of titanium, nickel and barium; calcined product of titanium, antimony, and chromium; calcined product of iron and zinc; calcined product of iron, zinc, and chromium; calcined product of titanium, zinc, cobalt, and nickel; calcined product of cobalt, aluminum, and chromium; calcined product of cobalt and aluminum; calcined product of cobalt, aluminum, and zinc; calcined product of copper and chromium; and calcined product of iron, manganese, and copper.

4. The method as set forth in claim 2, wherein said metal oxides are selected from the group consisting of titanium oxide, and zinc oxide.

5. The method as set forth in claim 1, wherein said coloring matter is selected from the group consisting of aluminum powder, aluminum paste, cadmium sulfide, mica, magnesium silicate, aluminum silicate, and silica.

* * * * *